United States Patent
Cardy et al.

[19]

[11] Patent Number: 6,041,109
[45] Date of Patent: *Mar. 21, 2000

[54] TELECOMMUNICATIONS SYSTEM HAVING SEPARATE SWITCH INTELLIGENCE AND SWITCH FABRIC

[75] Inventors: Douglas Ross Cardy, Plano; Ken Rambo, Dallas; Carol Waller, Allen, all of Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/580,712

[22] Filed: Dec. 29, 1995

[51] Int. Cl.[7] .............................. H04M 7/00; H04M 3/00
[52] U.S. Cl. ........................ 379/201; 379/219; 379/220; 379/243
[58] Field of Search ................... 379/67, 88, 89, 379/201, 67.1, 210, 207, 216, 230, 93.05, 93.09, 93.15, 115, 121, 156, 196, 219, 220, 229, 242, 243

[56] References Cited

U.S. PATENT DOCUMENTS

| | | | |
|---|---|---|---|
| 4,201,891 | 5/1980 | Lawrence et al. | 370/58 |
| 4,821,034 | 4/1989 | Anderson et al. | 340/825.8 |
| 4,872,157 | 10/1989 | Hemmady et al. | 370/60 |
| 4,893,302 | 1/1990 | Hemmady et al. | 370/58 |
| 5,272,749 | 12/1993 | Masek | 379/216 |
| 5,327,486 | 7/1994 | Wolff et al. | 379/96 |
| 5,329,520 | 7/1994 | Richardson | 370/16 |
| 5,418,844 | 5/1995 | Morrisey et al. | 379/207 |
| 5,530,852 | 6/1996 | Meske, Jr. et al. | 395/600 |
| 5,583,920 | 12/1996 | Wheeler, Jr. | 379/88 |

(List continued on next page.)

FOREIGN PATENT DOCUMENTS

WO 95/29564  11/1995  WIPO .

OTHER PUBLICATIONS

Elixmann et al., "Open Switching—Extending Control Archiectures to Facilitate Applications," *International Switching Symposium*, vol. 2, Apr. 23–28, 1995, Berlin, Germany, pp. 239–243.

Kabay et al., "The Service Node—An Advanced IN Services Element," *BT Technology Journal*, vol. 13, No. 2, Apr. 1995, Ipswich, Great Britain, pp. 64–72.

Mayer et al., "Service Net–2000: An Intelligent Network Evolution," *AT&T Technical Journal*, vol. 70, No. 3/4, 1991, Short Hills, USA, pp. 99–110.

(List continued on next page.)

*Primary Examiner*—Fan S. Tsang
*Assistant Examiner*—Allan Hoosain

[57] ABSTRACT

The present invention is a telecommunications system having separate switch fabric and switch intelligence. The system comprises a switch fabric, a switch intelligence, and a feature processor. The switch intelligence is logically separated from the switch fabric and comprises a switch fabric proxy, a facility service, a connection manager service, and a call segment instance service. The switch fabric proxy is coupled to the switch fabric via a vendor-specific first Application Programming Interface (API). The switch fabric proxy supports a second API, which is common across all vendors, representing functions supported by the switch fabric. A facility instance, which is instantiated by a facility service using a facility model, represents the bearer and signaling facilities of a party to a call, and interacts with the switch fabric proxy via the second API to communicate with the switch fabric. The connection manager service represents the connectors for a party to a call, and interacts with the switch fabric proxy via the second API to communicate with the switch fabric. A call segment instance, which is instantiated by a call segment instance service using a call model, represents the call logic and call data for a party to a call, and interacts with the connection manager service via a third API and with the facility instance via a fourth API. The feature processor interacts with the call segment instance via a fifth API to provide the telecommunications feature.

8 Claims, 5 Drawing Sheets

U.S. PATENT DOCUMENTS

| | | | |
|---|---|---|---|
| 5,608,446 | 3/1997 | Carr et al. | 348/6 |
| 5,610,976 | 3/1997 | Uota et al. | 379/127 |
| 5,619,557 | 4/1997 | Van Berkum | 379/88 |
| 5,619,562 | 4/1997 | Maurer et al. | 379/201 |
| 5,661,782 | 8/1997 | Bartholomew et al. | 379/67 |
| 5,712,908 | 1/1998 | Brinkman et al. | 379/119 |

OTHER PUBLICATIONS

Shabana et al., "Intelligent Switch Architecture," *Proceedings of the National Communications Forum*, vol. 42, No. 2, Sep. 30, 1988, Chicago, USA, pp. 1312–1320.

Maruyama, "A Concurrent Object–Oriented Switching Program in Chill," *IEEE Communications Magazine*, vol. 29, No. 1, Jan. 1991, New York, USA, pp. 60–68.

TELECOMMUNICATIONS SYSTEM HAVING SEPARATE SWITCH INTELLIGENCE AND SWITCH FABRIC

BACKGROUND OF THE INVENTION

1. Field of the Invention

The present invention relates generally to network switching and more particularly to a telecommunications system having separate switch intelligence and switch fabric.

2. Related Art

A conventional telecommunications network comprises three basic components: user terminals (e.g., telephones), communications busses (e.g., telephone lines) and switches. The switches are used to selectively connect the user terminals via the communications busses. Each switch comprises two basic components: the switch fabric, which physically interconnects the communications busses, and the switch intelligence, which directs the operation of the switch fabric based on control signals (e.g., telephone numbers) received by the switch.

In recent years, however, the telecommunications features offered by service providers (including both local and long distance service providers) have increased dramatically in both number and complexity. Because many of these features are implemented primarily at the switch, the complexity of the switch intelligence has increased in kind to include complex call processing logic. Despite the dual nature of the switch, standard telecommunications architectures such as Advanced Intelligent Network (AIN) and SS7 have continued to incorporate both switch intelligence and switch fabric into a single device. The retention of this monolithic switching approach in the face of these changes has substantial disadvantages.

The primary disadvantages result from the fact that switches from different manufacturers may employ unique methods of control and/or unique computing languages in their switches. Thus when a service provider offers a new feature requiring a change in switch intelligence, the change must be implemented by the switch vendor. In a network comprising switches from several manufacturers, these changes must be coordinated to ensure a coincident release of the new feature at all switches. Further, each switch vendor must implement a switch change required by one service provider without disturbing the switch intelligence aspects required by other service providers. Finally, changes cannot be implemented centrally, but must be implemented separately at each switch. This arrangement requires substantial lead time for a change, typically on the order of two years or more.

What is needed, therefore, is a telecommunications network where the switch intelligence is separated from the switch fabric.

SUMMARY OF THE INVENTION

The present invention is a telecommunications network having separate switch fabric and switch intelligence. The system comprises a switch fabric, a switch intelligence, and a feature processor. The switch intelligence is logically separated from the switch fabric and comprises a switch fabric proxy, a facility service, a connection manager service, and a call segment instance service. The switch fabric proxy is coupled to the switch fabric via a vendor-specific first Application Programming Interface (API). The switch fabric proxy supports a second API, which is common across all vendors, representing functions supported by the switch fabric. A facility instance, which is instantiated by a facility service using a facility model, represents the bearer and signaling facilities of a party to a call, and interacts with the switch fabric proxy via the second API to communicate with the switch fabric. The connection manager service represents the connectors for a party to a call, and interacts with the switch fabric proxy via the second API to communicate with the switch fabric. A call segment instance, which is instantiated by a call segment instance service using a call model, represents the call logic and call data for a party to a call, and interacts with the connection manager service via a third API and with the facility instance via a fourth API. The feature processor interacts with the call segment instance via a fifth API to provide the telecommunications feature.

The switch intelligence further comprises two call processing creation environments. The first, called a call model creation environment, is employed to access the call segment instance service via a programming API to modify existing call models and to create new call models. The second call processing creation environment is employed to access the facility service via a programming API to modify existing facility models and to created new facility models.

One advantage of the present invention is to facilitate rapid creation and deployment of new telecommunications features.

Another advantage of the present invention is to allow software and hardware components to be reused across multiple features and products.

Another advantage of the present invention is to permit scalability both at the processor level and at the level of the communications infrastructure.

Another advantage of the present invention is to provide an architecture that is reusable across future switch and port infrastructures (for example, broadband).

Another advantage of the present invention is to provide an infrastructure that supports the ability to engineer applications in varying levels of centralization or distribution, based on usage.

Another advantage of the present invention is to define a call processing environment in which buy/build decision can be made on major components of the call processing system, including facilities, signaling, and call data processing.

Another advantage of the present invention is to define a call processing environment in which the price/performance decisions of the switch call processing and switch hardware capabilities are decoupled, resulting in an optimized business buying strategy.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

I. Introduction

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

II. The Intelligent Distributed Network Architecture

As used herein, the Intelligent Distributed Network Architecture (IDNA) defines the infrastructure and network elements of an advanced switching system. The term network element (NE) is used herein to describe any physical device within the IDNA. An NE within the IDNA is named according to its primary function. Therefore, an NE that performs primarily switch intelligence functions is named a Switch Intelligence Network Element (SI-NE). A functional entity (such as switch intelligence) may be split across multiple NEs, in which case all of the NEs are denoted by their primary functions (such as SI-NE).

Figure 1:
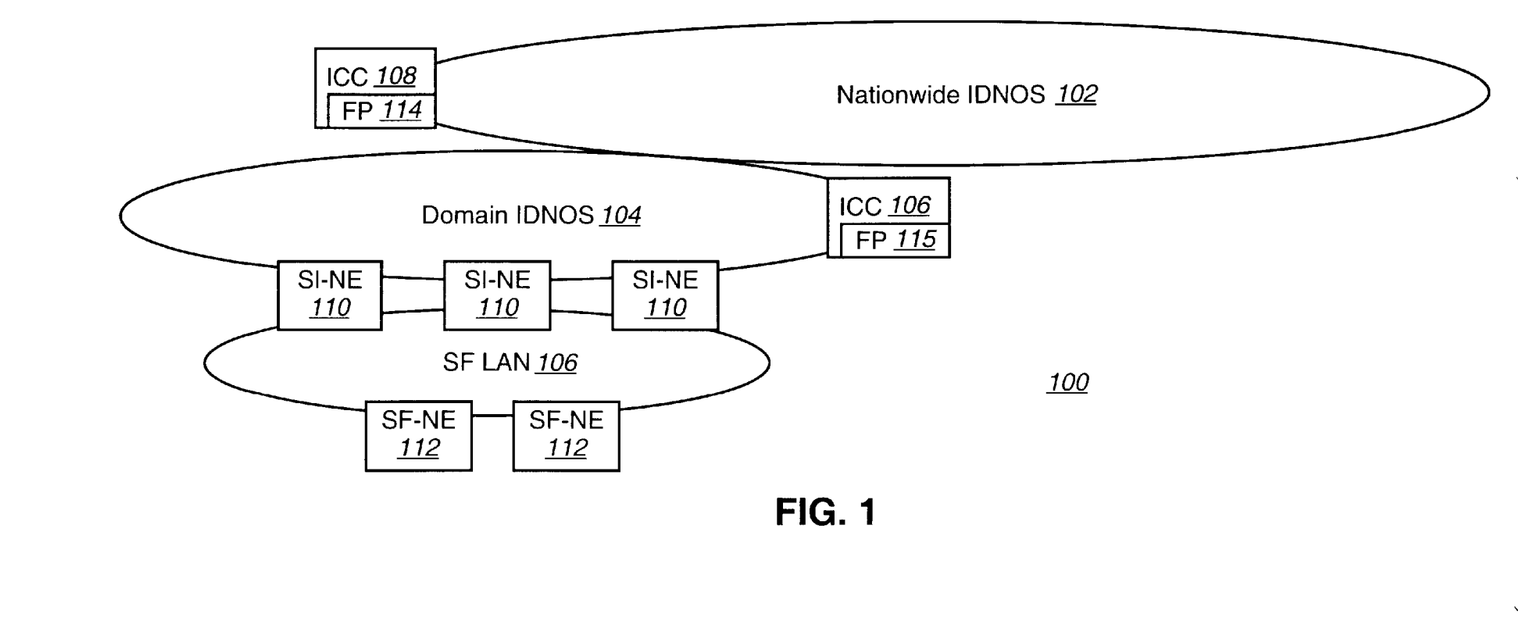
FIG. 1 is a network block diagram depicting the major components of a network according to a preferred embodiment of the present invention.

FIG. 1 is a network block diagram depicting the major components of a network according to a preferred embodiment of the present invention. Referring to FIG. 1, network 100 comprises a Nationwide Intelligent Distributed Network Operating System (IDNOS) 102 and a plurality of Domain IDNOS 104 (only one Domain IDNOS 104 is shown). IDNOS 104 is the infrastructure supporting the communications, execution, and maintenance of processes within network 100. IDNOS is essentially similar in nature to DCE client/server application environments or CORBA distributed object execution environments.

Each Domain IDNOS 104 is coupled to Nationwide IDNOS 102 and at least one Intelligent Computing Complex (ICC) 108. ICC 108 is a computing element that provides services to control the calls processed by Switch Intelligence NEs 110. Each ICC 108 comprises at least one Feature Processor 114. Feature Processor 114 is the functional entity which contains all IN-style logic associated with call processing. This logic is all logic which controls advanced call services and call structure, and may overlap the logic of Switch Intelligence NE 110 in areas where rapid service creation has forced this structure. Feature Processor 114 is usually thought of as comprising all logic not associated with either signaling or call models.

Each Domain IDNOS 104 supports a switching function comprising at least one Switch Intelligence NE 110 coupled to at least one Switch Fabric NE 112. Switch Intelligence NEs 110 are the elements of network 100 that provide call processing functions to manage and process the facilities provided by Switch Fabric NEs 112. Switch Intelligence NE 110 contains all aspects of data processing required to complete a simple bearer connectivity request, as well as all logic required to determine points in call where feature involvement is required. Switch Intelligence NE 110 can be a general-purpose computer, such as a Sun or HP Workstation.

Switch Fabric NE 112 is the element of network 100 that provides the physical facilities necessary to complete a call. These resources include, but are not limited to, bearer devices (T1's, DS0's), network matrix devices (network planes and their processors), link layer signal processors (SS7 MTP, ISDN LAPD), and specialized circuits (conference ports, audio-tone-detectors). Switch Fabric NE 112 represents the hardware switch component provided by a switch manufacturer, such as Nortel.

In a preferred embodiment, network 100 is implemented as a client-server system using functional application programming interfaces (APIs) defined for each service. For example, if an application running on a SI-NE 110 requires a service provided by a FP 114, the SI-NE 110 acts as a client to request the service via an API, and the FP 114 acts as a server to provide the service. Conversely, if an application running on a FP 114 requires a service provided by a SI-NE 110, the FP 114 acts as a client to request the service via an API, and the SI-NE 110 acts as a server to provide the service.

Each call to a server is made through these APIs, regardless of the geographic separation between the client and server. IDNOS 102 allows the client and server to be separated geographically across IDNOS-compatible interfaces and provides a remote procedure call (RPC) capability that is transparent to the client and the server. Thus, applications can be designed as though both client and server were in the same processor, independent of the actual underlying RPC mechanism. Thus, the present invention provides location transparency.

This functional interface method is substantially different from the message-based interfaces provided by traditional IN architectures. These interfaces typically assume a specific distribution topology, and require an underlying infrastructure that is inherently tied to a particular communications method (CCS7, MTP, etc.). The RPC-based approach employed in network 100 allows the underlying communications method to be evolved independently of the design of upper-layer clients and servers.

The RPC client-server model is restricted to interfaces at the service level. Interfaces within the actual servers (between components of the server) are vendor-proprietary, and are not subject to this specification.

In one embodiment, the present invention is implemented as computer software embedded in a computer usable medium as computer readable program code means. The computer usable medium can be, for example, a hard disk drive or a removable storage medium such as a floppy disk.

A. IDNA Services

Figure 2:
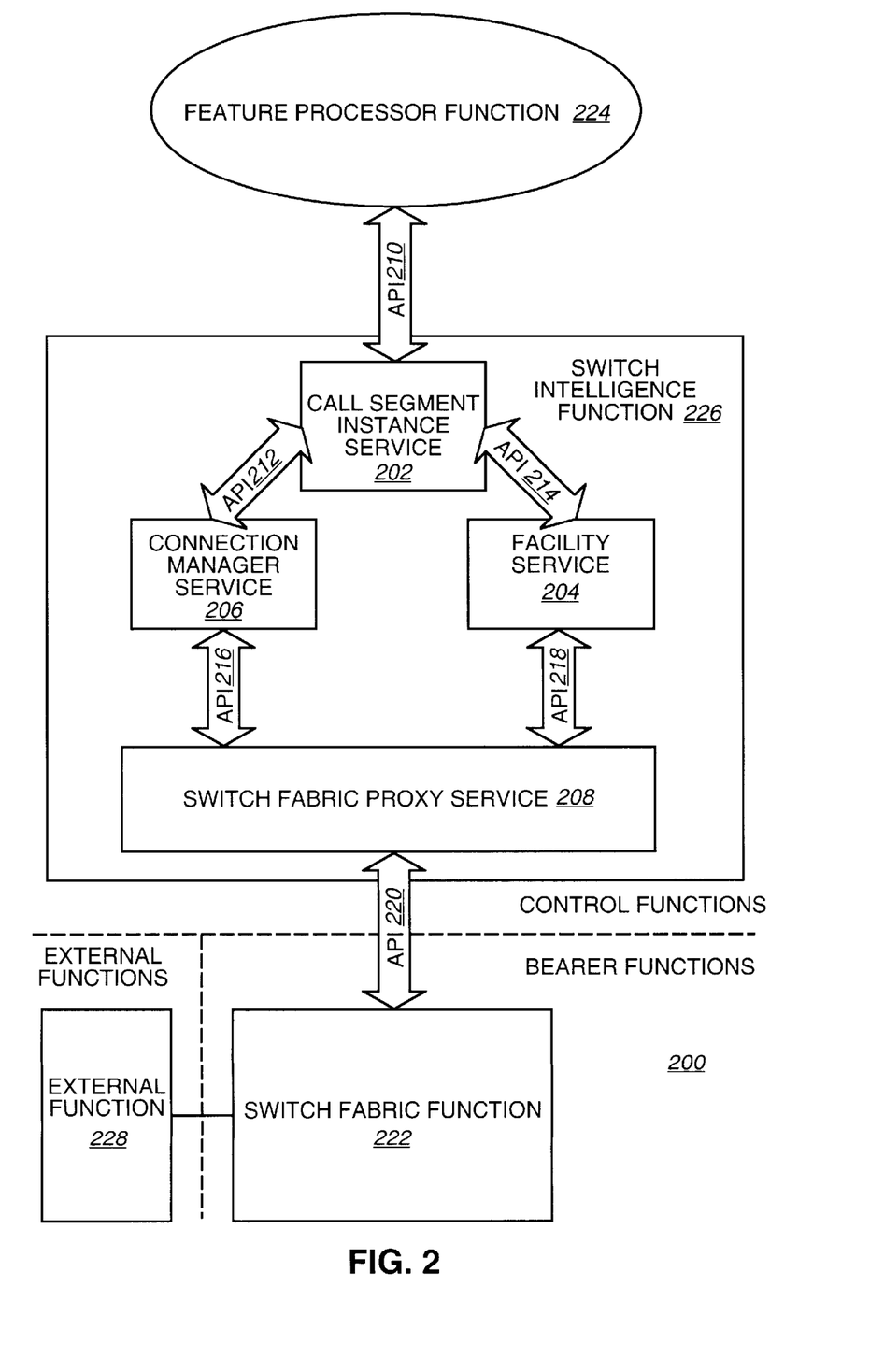
FIG. 2 is a functional block diagram of a switch node embodying a switching function according to a preferred embodiment of the present invention.

FIG. 2 is a functional block diagram of a Switch Node 200 embodying a switching function according to a preferred embodiment of the present invention. This functional view can be thought of as a cross-section of network 100 that shows how the switching functions deployed onto network elements interact to provide telecommunications features according to a preferred embodiment of the present invention. Switch Node 200 is a logical entity implemented as functions which are executed by the physical network elements depicted in FIG. 1. Each function may be provided by one or more NEs. For example, Switch Fabric Function 222 may be provided by one Switch Fabric NE 112, or may be distributed over two or more Switch Fabric NEs 112.

For clarity, the depiction of Switch Node 200 is divided into bearer functions and control functions. The control functions comprise Feature Processor Function 224 and Switch Intelligence Function 226. Switch Intelligence Function 226 further comprises Call Segment Instance Service 202, Facility Service 204, Switch Fabric Proxy Service 208, and Connection Manager Service 206. The bearer functions comprise Switch Fabric Function 222. For ease of explanation, FIG. 2 also depicts external functions comprising External Function 228 (for example, a PBX function).

Switch Fabric Proxy Service 208 is a device driver preferably supplied by the manufacturer of the Switch Fabric NE(s) executing Switch Fabric Function 222. Switch Fabric Proxy Service 208 provides Connection Manager Service 206 and Facility Service 204 with a common interface to Switch Fabric Function 222 and a common view of the services provided by Switch Fabric Function 222.

In a preferred embodiment, the interface between Switch Fabric Proxy Service 208 and Switch Fabric Function 222 is a vendor-specific ATM interface, and the interface between Call Segment Instance Service 202 and Facility Service 204 is an ISDN variant Q.931.

Call Segment Instance Service 202 is the process which actually brings up and takes down individual connections to complete a call. Facility Service 204 is a protocol state machine that provides all data processing related to the physical resources (that is, facilities) involved in a call. As discussed below, Call Segment Instance Service 202 and Facility Service 204 are programmable to generate a call model which provides a run-time environment for Feature Processor Function 224 to establish calls.

Connection Manager Service 206 rationalizes abstract connection requests from Call Segment Instance Service 202 and resolves these requests into physical connection requests to Switch Fabric Function 222. For example, Connection Manager Service 206 will receive a request to make a particular connection, and translate this request into a request to Switch Fabric Function 222 to physically connect two particular ports.

Services 202, 204, and 206 are not instances, but rather monolithic services which maintain instances within themselves to establish a particular call segment. Each of the services described herein fulfills the interfaces described within this specification using specific procedures. However, as will be apparent to one skilled in the relevant art, other procedures will satisfy the interfaces described, so long as all of the API-specified interfaces are satisfied.

As stated above, the switching function is divided into two primary functions: Switch Intelligence Function 226 and Switch Fabric Function 222. These two functions cooperate in a client/server relationship to complete requests for bearer connectivity (e.g., phone calls). A fundamental conceptual distinction between Switch Intelligence Function 226 and Switch Fabric Function 222 is the assignment of data and devices. All devices necessary to complete a bearer connectivity, including trunk cards, switch matrix networks, specialized circuitry, and link processor cards, are assigned to Switch Fabric Function 222. All data (i.e., processing of information) from these devices, including the processing of signaling, call state, and feature request information, is assigned to Switch Intelligence Function 226.

As stated above, Switch Intelligence Function 226 and Switch Fabric Function 222 correspond logically to two physical computing devices called Network Elements (NEs). Switch Intelligence Function 226 resides within one or more Switch Intelligence NEs (SI-NEs) 110, whereas Switch Fabric Function 222 resides within one or more Switch Fabric NEs (SF-NEs) 112.

Communication between these SF-NEs and SI-NEs is performed using an interface which is preferably supplied by the manufacturer of the Switch Fabric Function 222. This interface consists of Switch Fabric Proxy Service 208 and API 220. Switch Fabric Proxy Service 208 is a software element, usually residing on an SI-NE, which provides a normalized interface to the functional elements of Switch Intelligence Function 226. Switch Fabric Proxy Service 208 permits SF-NE vendors to use any control interface between an SF-NE and Switch Fabric Proxy Service 208 (API 220), but forces SF-NE vendors to provide a uniform interface from Switch Fabric Proxy Service 208 to Switch Intelligence Function 226 (APIs 216 and 218). Requests flow between Switch Intelligence Function 226 and Switch Fabric Proxy Service 208 as API procedure calls and responses defined by APIs 216 and 218. As will be apparent to one skilled in the relevant art, APIs 216 and 218 can be considered to be two portions, perhaps overlapping, of a single API.

1. The IDNA Call Model

Figure 3:
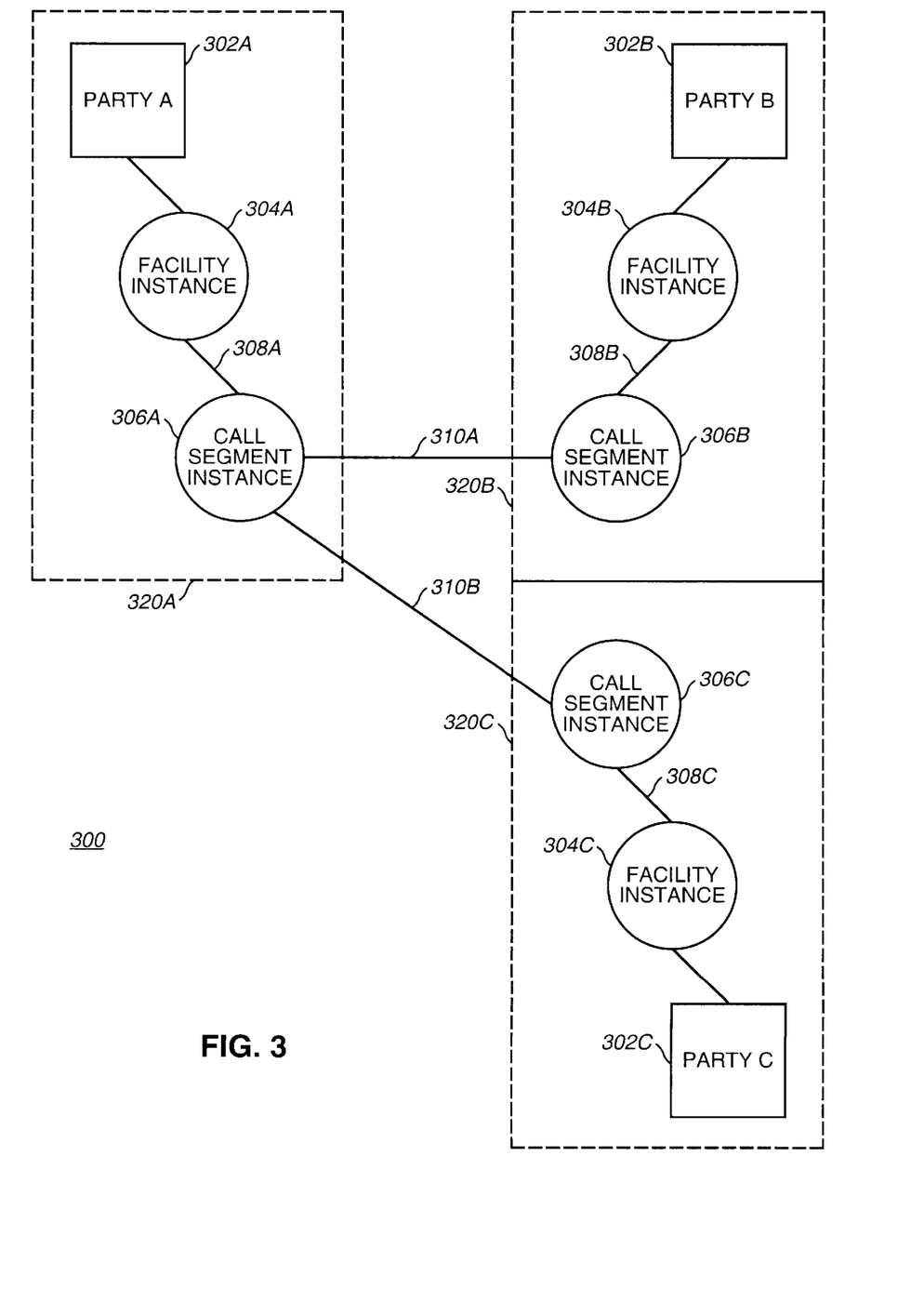
FIG. 3 is an object view of a three-way call as an instance of the call model according to a preferred embodiment of the present invention.

The IDNA call model is a method of representing the bearer, signaling, and call processing facilities associated with a call. FIG. 3 is an object view of a three-way call 300 as an instance of the call model according to a preferred embodiment of the present invention. The call model described in this specification is based on several fundamental concepts.

A call is composed of a number of participating members, one for each party to a call; each member is known as a "call half." A call half provides all control for the facilities, subscribers, databases, and call states for the participating member. Call 300 comprises three parties 302A–C, and thus three call halves 320A–C.

Each call half 320 is composed of two primary elements: Call Segment Instance 306 and Facility Instance 304. Call Segment Instance 306 is an instance of Call Segment Instance 202. Call Segment Instance 306 supports the data and interfaces required for call state, subscriber, and feature processing. Call Segment Instance 306 represents the processing of an endpoint in a call. Facility Instance 304 is an instance of Facility Service 204. Facility Instance 304 supports the processing of events on a facility and correlates these events into requests to Call Segment Instance 306.

The processing of data related to physical facilities, contained within Facility Instance 304, is isolated from the actual physical facilities contained within Switch Fabric NE 112 (represented by Switch Fabric Proxy Service 208). Switch Fabric NE 112 provides minimal data processing capabilities.

Figure 4:
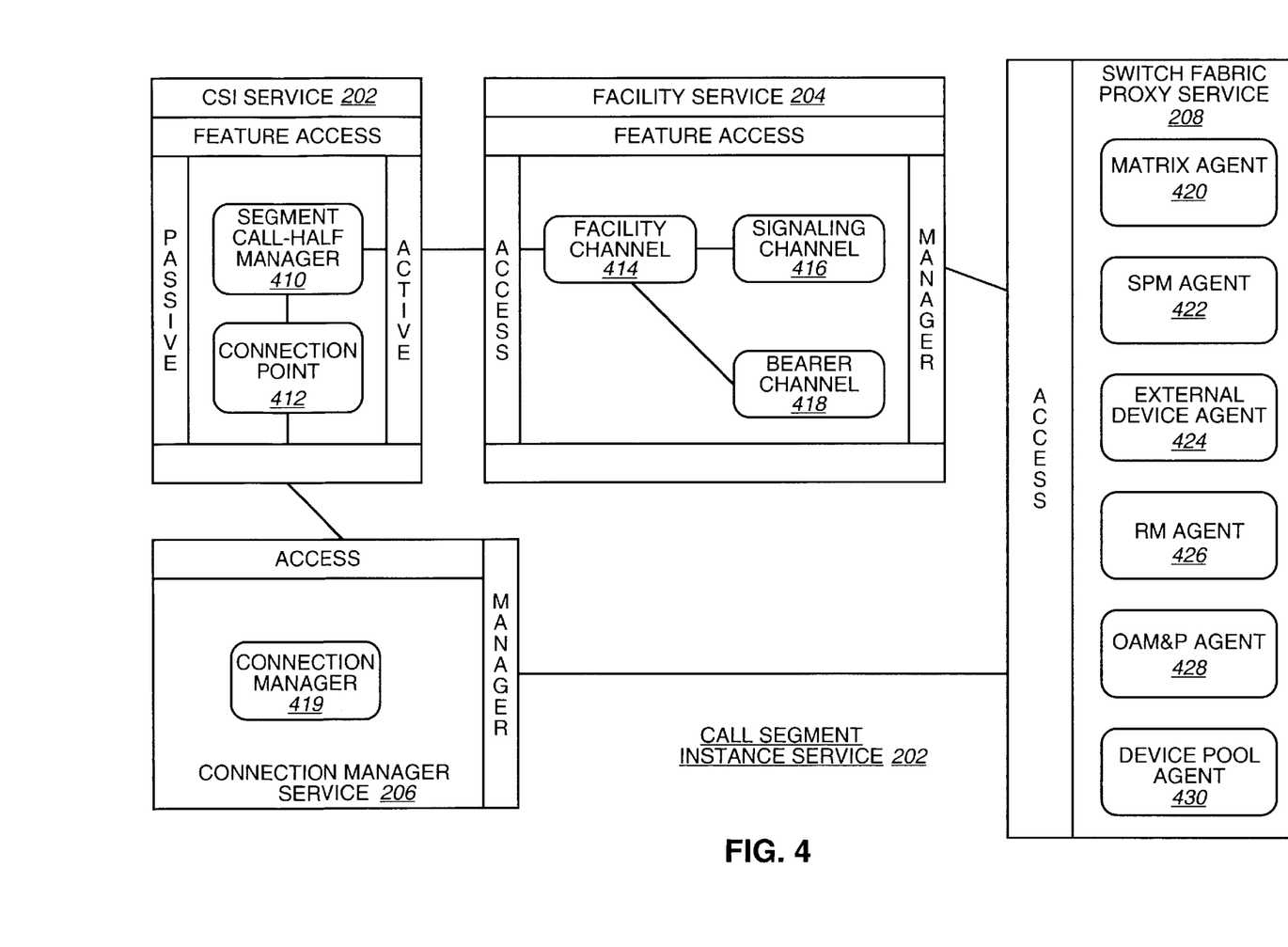
FIG. 4 is an object view of the conceptual elements contained within the services according to the present invention.

FIG. 4 is an object view of the conceptual elements contained within the services according to the present invention. In the following discussion, a distinction is drawn between services, which are real and defined, and conceptual entities, which are provided for illustrative purposes only.

The following paragraphs define the services of Switch Intelligence Function 226 according to a preferred embodiment of the present invention, as well as the conceptual entities contained within these services, with reference to FIG. 3.

2. The Call Segment Instance Service

Call Segment Instance Service 202 is the IDNOS service that performs call half processing, and is the entity that represents the status of call half 302, including all connection points and associated resources. Call Segment Instance Service 202 communicates to Facility Service 204 (for protocol processing), to Feature Processor Function 224 (for feature processing), and to Connection Manager 206 (for connection control). Call Segment Instance Service 202 corresponds to the AIN 1.0 Call Segment (CS) object.

Call Segment Instance Service 202 is provided via a Call Segment Instance 306 that is specifically associated with a particular active facility at a particular call state. Identical active facilities with different call states are considered different Call Segment Instances 306.

Call Segment Instance Service 202 comprises two conceptual entities: Connection Point (CP) Conceptual Entity 412 and Segment Call-Half Manager Conceptual Entity 410.

Connection Point (CP) Conceptual Entity 412 is the entity aware of the connectivity of connectors within a Call Segment Instance 306. A CP 412 is a representation of connectors in some state of bearer connectivity (one-way, two-way, multi-way, etc.). Multiple CPs 412 within a call are not in a state of bearer connectivity, but may be either brought into connectivity by joining them. A CP 412 may be removed from a state of bearer connectivity by splitting it.

CP 412 maintains information relevant to the status of a call half's connectors; as such, no state machine is needed to provide that capability. A connector represents the connection between two (or more) connection points. A connector may be either an active connector or a passive connector. An active connector is any connector between a Call Segment Instance 306 and a Facility Instance 304; a Call Segment Instance 306 can have only one active connector. A passive connector is any connector between two Call Segment Instances 306. A CP can have a maximum of one active connector, but can have any number of passive connectors. However, a CP does not require an active connector; a CP may represent a connection of two passive connectors (for example, a call on hold with music). Since CPs are not required to have an active connector, there may be a situation where segments are not managing actual facilities, but are instead managing the connection between other segments. If a segment were placed in such a situation, it would represent and control the relationship between two end-point segments.

Segment Call-Half Manager Conceptual Entity 410 represents the call data processing within a segment. The primary aspect of Segment Call-Half Manager 410 is a Call State Machine, which is a finite state machine responsible for the execution of basic call processing. This object is the state machine typically associated with call processing within ITU standards.

3. The Facility Service

Facility Service 204 is a protocol state machine which provides all data processing related to the physical resources (i.e., facilities) involved in a call. Facility Service 204 processes raw signaling data provided by Switch Fabric Proxy Service 208. The resulting actions describe detailed call progress changes that initiate abstract call progress changes (which are given to Call Segment Instance 306). Information provided to Facility Service 204 by Switch Fabric Proxy Service 208 is usually formed of facility-related events (on-hook, off-hook, wink) and actual data received (DTMF digits, ISUP messages, Q.931 messages) from the facility. Switch Fabric Proxy Service 208 provides this information in an unprocessed form, allowing Facility Service 204 to process this data into abstract events for Call Segment Instance 306 (e.g., Call Setup Request, Call Disconnect Request, etc.).

Facility Service 204 also acts as a server to the Call Segment Instance Service 202, fulfilling requests for facility manipulation. This manipulation is received as abstract requests (e.g., Provide Tone, Setup Request, Disconnect) and causes the facility to perform actions on the Switch Fabric Proxy Service to fulfill the manipulation requests. The majority of the APIs defined for Facility Service 204 that are provided to Call Segment Instance Service 202 are not protocol-specific. Rather, these requests are abstract interfaces that span all protocol families and yield protocol-specific actions based on logic contained entirely within Facility Service 204.

Facility Service 204 comprises Facility Channel Conceptual Entity 414, Signaling Channel Conceptual Entity 416, and Bearer Channel Conceptual Entity 418.

Facility Channel (FCH) Conceptual Entity 414 is a functional component which provides the ability to logically "bind" a bearer channel to its associated signaling. This binding happens on indication from the Signaling Channel that a Bearer Channel is required for the call.

Signaling Channel (SCH) Conceptual Entity 416 is the object that addresses all of those aspects of FCH 414 associated with communications with distant SF-NEs 112 and SI-NEs 110. SCH 416 takes care of the signaling for a call half. It is minimally available in three flavors: SS7 ISUP, PRI, and inband. SCH 416 is where new types of signaling are implemented (for example, BTUP or R2).

Bearer Channel (BCH) Conceptual Entity 418 provides an association between a Call Segment Instance 306 and the set of physical devices associated with providing bearer services for that Call Segment Instance 306. These physical devices include T1s, E1s, DS0s, and other bearer devices, but exclude any device strictly associated with signaling. This association permits invoking entities to refer to these devices in an abstract command structure, eliminating the need to refer to all devices within the association. There is one BCH 418 associated with each FCH 414. However, BCH 418 may represent a group of circuits; for example, a 6×64 wideband call would have six circuits actually involved but would be represented as one BCH 418.

4. The Connection Manager Service

Connection Manager Service 206 provides the ability to establish and track connections within an SF-NE 112. Connection Manager Service 206 rationalizes abstract connection requests from Call Segment Instance Service 202 and resolves these requests into physical connection requests for Switch Fabric Function 222. For example, Connection Manager Service 206 will receive a request to make a particular connection, and translate this request into a request to physically connect two particular ports. Connection Manager Service 206 will minimally receive connection instructions from each Call Segment Instance 306, and will resolve these instructions into specific matrix actions for Switch Fabric Function 222 which connect the devices controlled by each segment. A very basic call will result in two segments which provide data to Connection Manager Service 206, which then resolves this data into a single connection request to Switch Fabric Proxy Service 208.

5. The Switch Fabric Proxy Service

Switch Fabric Proxy Service 208 provides all mechanisms to control Switch Fabric Function 222 bearer and connectivity resources. It is the fundamental aspect of Switch Fabric Service 112 that it provides clients, such as Call Segment Instance 306, the ability to associate bearer resources and to request connectivity of resources.

Switch Fabric Proxy Service 208 provides IDNOS-compatible APIs 216 and 218 towards the remainder of call processing, and provides Switch Fabric-specific API 220 towards the actual switch fabric equipment (SF-NEs 112). As such, Switch Fabric Proxy Service 208 acts as a gateway between the IDNOS client/server environment and the Switch Fabric-specific messaging environment. Switch Fabric Proxy Service 208 is required to be accessible through the IDNOS RPC execution support capability, whereas SF-NEs 112 are not required to be accessible through the IDNOS RPC. It is acceptable to have the Switch Fabric Proxy Service 208 built within an SF-NE 112, but such a configuration would require an IDNOS-compliant physical interface between the SF-NE 112 and communicating SI-NEs 110.

Switch Fabric Proxy Service 208 provides interfaces to the call processing clients that deal with device connectivity, signaling, etc. These interfaces (also called "agents") are grouped into the conceptual entities described below.

Signal Protocol Manager (SPM) Conceptual Entity 422 is a distributor of signaling information to the various Signaling Channels which process such information. SPM 422 is capable of rudimentary processing of signaling information and may combine multiple events into a single Signaling Channel indication (under the guidance of Signaling Channel 416).

Matrix Conceptual Entity 420 is the functional component responsible for interconnection of compatible bearer channels, enabling the transfer of information between bearer channels on facilities external to SF-NE 112. Matrix 420 performs its functions under the control of Connection Manager 419 within SI-NE 112.

External Device Conceptual Entity 424 is the functional component that comprises all physical interfaces external to SF-NE 112. These external interfaces may provide bearer transport, data transport, or a mixture of bearer and data transport. External Device Conceptual Entity 424 also encompasses those devices that provide service circuit-typed capabilities (receivers, voice recognizers, etc.).

OAM&P Manager Conceptual Entity 428 is the functional component that handles the operation, administration, maintenance, and provisioning functions for an SI-NE 110 and an SF-NE 112. This functionality is distributed between the SI-NE 110 and SF-NE 112.

Resource Manager Conceptual Entity 426 is the object responsible for maintaining a distributed view of the current availability of resources throughout a Switch Node 200, including all resources that directly apply to a Switch Intelligence Function 226.

Device Pool Conceptual Entity 430 represents all available external devices that may be attached to Facility Channel 414 as External Devices 424 for purposes of signaling or bearer service.

B. API Interfaces

In a preferred embodiment of the present invention, many of the interfaces are implemented as application programming interfaces (APIs). As will be apparent to one skilled in the relevant arts, other interface implementations may be employed without departing from the spirit and scope of the present invention.

Figure 5:
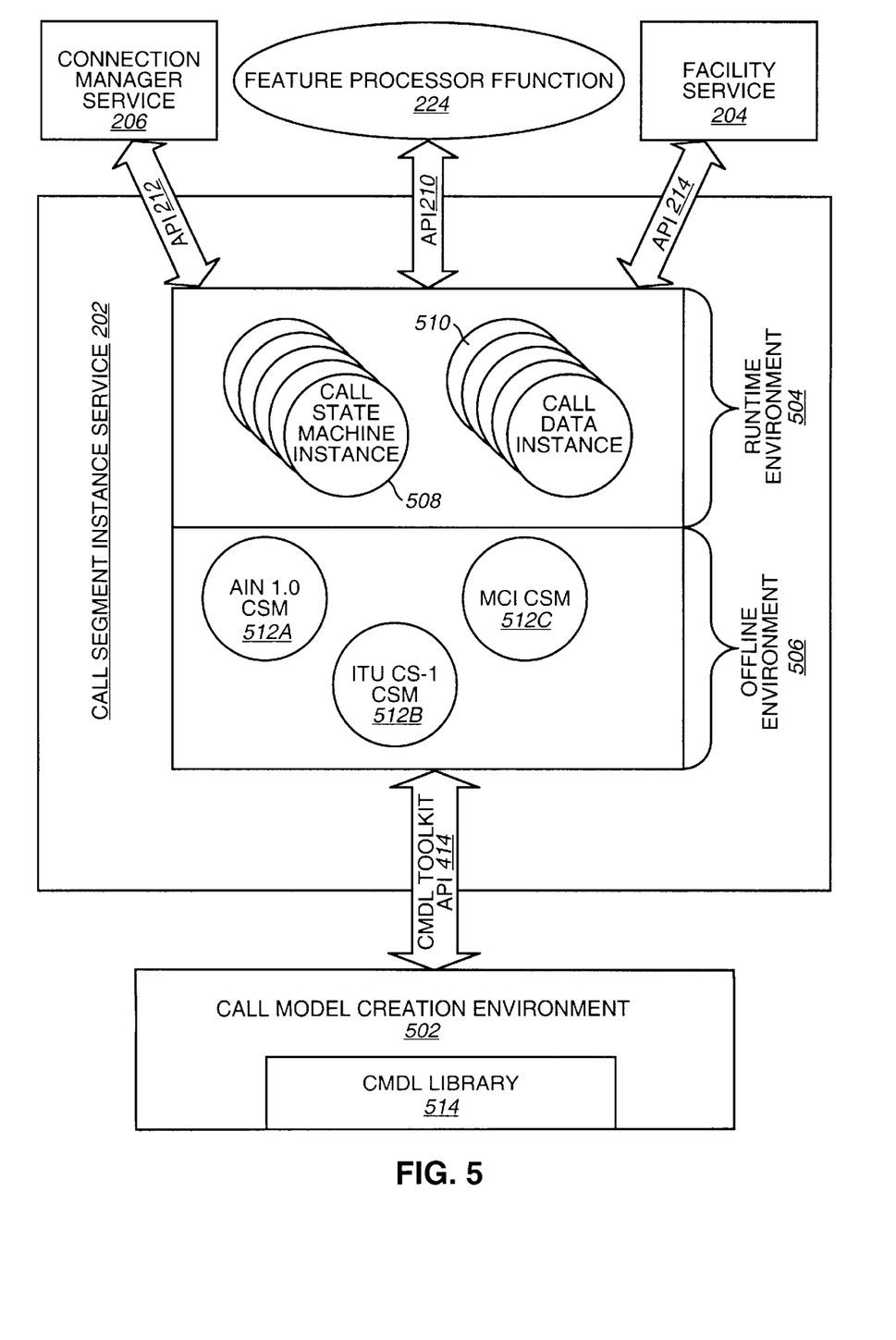
FIG. 5 is an object view of Call Segment Instance Service according to the present invention.

The capability to customize Switch Intelligence Function 226 is a hallmark of the present invention. In a preferred embodiment of the present invention, Call Segment Instance Service 202 and Facilities Service 204 are independently customizable. Thus, according to a preferred embodiment of the present invention, Call Segment Instance Service 202 and Facilities Service 204 each provide two types of APIs: programming APIs and control APIs. FIG. 5 is an object view of Call Segment Instance Service 202, and is useful in explaining the difference between these two types of APIs. As will be apparent to one skilled in the relevant art, this discussion is applies in a similar fashion to Facilities Service 204.

A significant advantage of the provision of standard control APIs is that Call Segment Instance Service 202, Facilities Service 204, Connection Manager Service 206, and Switch Fabric Proxy Service 208 may each be provided by different vendors.

1. Programming (Non-Instance) APIs

In FIG. 5, Call Segment Instance Service 202 is depicted as being comprised of two environments: Offline Environment 506 and Runtime Environment 504. Offline Environment 506 is accessed by Call Model Creation Environment 502 via call Model Definition Language (CMDL) Toolkit API 414. CMDL Toolkit API 414 is a programming (non-instance) API. Facility Service 204 has a similar toolkit interface. Call Model Creation Environment 502 is based on the service creation environment concept. Facility Service 204 has a similar service creation environment.

These API interfaces permit element behaviors to be redefined to facilitate the creation of new services, either within the switching system or within an associated feature engine. CMDL Toolkit API 414 can be employed to create class definitions for aspects of the call model, such as Call State Machines 512, prior to runtime. For example, these class definitions may include a Call State Machine 512A for AIN 1.0, a Call State Machine 512B for ITU CS-1, and a Call State Machine 512C for an MCI call state machine. Call Segment Instance Service 202 creates instances 508 of the defined call state machines, and maintains call data instances 510 in response to requests from Feature Processor Function 224 received via control APIs 210, 212, and 214. The programming API for Facility Service 204 can be employed in a similar fashion, for example, to create a Signaling State Machine.

Call Model Creation Environment 502 provides a CMDL Library 514 of the states, events, and atomics which make up the CMDL. In a state machine, an atomic is a non-controlling single step action (for example, a procedure call). An event is a notification to the Switch Fabric Function of activity.

2. Control (Instance) APIs

In operation, the Runtime Environment 504 of Call Segment Instance Service 202 interacts with Feature Processor Function 224, Connection Manager Service 206, and Facility Service 204 via control APIs 210, 212, and 214, respectively, to perform call processing. Call Segment Instance Service 202 instantiates (i.e., creates), for example, Call State Machine Instances 508 and Call Data Instances 510 in response to requests for service.

Because Connection Manager Service 206 and Facility Service 204 provide standard control APIs, the provider of Switch Intelligence Function 226 has the ability to "mix and match" components within the Switch Intelligence Function, allowing a "buy/build" decision on a case by case basis.

III. An Example: Three-Way Call

As an example of the operation of the present invention according to a preferred embodiment, consider a three-way call, which is a specific type of a conference call. This example will be described with reference to FIG. 3. The three way call is a feature which has been created for, and is running on, a Feature Processor 114.

A three-way call is placed via an External Function 228 having both bearer and signaling components (e.g., a LEC or PBX). In response, the signaling component of External Function 228 provides a signaling request to Switch Fabric Function 222, which maps the request to Switch Intelligence Function 226. Facility Service 204 performs certain signaling processing (perfoming early address determination, unpacking various protocols into a common protocol, parsing of the common protocol) and passes the event to Call Segment Instance Service 202, which instantiates a Call Segment Instance 306A, including a Call State Machine Instance 508, to represent call half 320A.

Call Segment Instance Service 202 informs Connection Manager 206 of the status of Active Connector 308A and any Passive Connectors 310 (there are none yet, as Party A is still the only party to the call). In response, Connection Manager Service 206 directs Switch Fabric Function 222 (via Switch Fabric Proxy Service 208) to make the required physical connections.

Because Party A is requesting a feature (the three-way call), Call Segment Instance Service 202 triggers Feature Processor Function 224. In response, Feature Processor Function 224 provides a command, via API 210, to Call Segment Instance Service 202, to add Parties B and C to the call. In response, Call Segment Instance Service 202 instantiates Call Segment Instances 306B and 306C, instructs Facility Service 204 to instantiate Facility Instances 304B and 304C, and instructs Connection Manager Service 206 to create Passive Connectors 310A and 310B and Active Connectors 308B and 308C. Connection Manager Service 206 directs Switch Fabric Function 222 (via Switch Fabric Proxy Service 208) to make the necessary physical connections, thus creating the three-way call.

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An apparatus for decentralizing communication services in a telecommunications system, comprising:

a switch fabric which provides bearer functions;

a switch intelligence which provides control functions for said switch fabric, said switch intelligence logically separated from said switch fabric;

a switch fabric proxy service for providing a normalized interface between said switch fabric and said switch intelligence for all communications involving said switch fabric by interfacing to said switch fabric with any one of a plurality of application program interfaces and interfacing to said switch intelligence with a uniform application program interface; and feature processor, said feature processor executing at least one telecommunications function, for interacting with said switch intelligence to thereby provide said telecommunications feature.

2. The system of claim 1, wherein said switch intelligence further comprises:

at least one facility instance instantiated by a facility service using a facility model, said facility instance representing the bearer and signaling facilities of a party to a call, for interacting with said switch fabric proxy service to communicate with said switch fabric.

3. The system of claim 2, wherein said switch intelligence further comprises:

a connection manager service representing the connectors for said party to a call for interacting with said switch fabric proxy service to communicate with said switch fabric.

4. The system of claim 3, wherein said switch intelligence further comprises:

at least one call segment instance instantiated by a call segment instance service using a call model, said call segment instance representing the call logic and call data for said party to a call, for interacting with said feature processor, said connection manager service, and said facility instance.

5. The system of claim 2, wherein said switch intelligence further comprises:

a first call processing creation environment, said first call processing creation environment interacting with said facility service, for modifying said facility model.

6. The system of claim 4, wherein said switch intelligence further comprises:

a second call processing creation environment, said second call processing creation environment interacting with said call segment instance service, for modifying said call model.

7. The system of claim 2, wherein said switch intelligence further comprises:

a third call processing creation environment, said third call processing creation environment interacting with said facility service, for creating new facility models.

8. The system of claim 4, wherein said switch intelligence further comprises:

a fourth call processing creation environment, said fourth call processing creation environment interacting with said call segment instance service, for creating new call models.

* * * * *